US011523388B2

(12) United States Patent
Tiirola et al.

(10) Patent No.: US 11,523,388 B2
(45) Date of Patent: Dec. 6, 2022

(54) METHOD AND APPARATUS FOR BACKHAUL IN 5G NETWORKS

(71) Applicant: Nokia Technologies Oy, Espoo (FI)

(72) Inventors: Esa Tapani Tiirola, Kempele (FI); Ilkka Keskitalo, Oulu (FI); Juha Sakari Korhonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/767,632

(22) PCT Filed: Nov. 30, 2017

(86) PCT No.: PCT/EP2017/081073
§ 371 (c)(1),
(2) Date: May 28, 2020

(87) PCT Pub. No.: WO2019/105564
PCT Pub. Date: Jun. 6, 2019

(65) Prior Publication Data
US 2020/0374873 A1    Nov. 26, 2020

(51) Int. Cl.
*H04J 3/00* (2006.01)
*H04W 72/04* (2009.01)
*H04L 5/14* (2006.01)
*H04W 72/14* (2009.01)

(52) U.S. Cl.
CPC .......... *H04W 72/0446* (2013.01); *H04L 5/14* (2013.01); *H04W 72/042* (2013.01); *H04W 72/0413* (2013.01); *H04W 72/14* (2013.01)

(58) Field of Classification Search
None
See application file for complete search history.

(56) References Cited

U.S. PATENT DOCUMENTS

| 10,912,085 | B2* | 2/2021 | Stirling-Gallacher | ....................... H04W 16/28 |
| 2011/0103292 | A1* | 5/2011 | Pasad | .................... H04L 5/0053 370/315 |
| 2012/0033588 | A1* | 2/2012 | Chung | ................... H04L 1/1812 370/280 |
| 2013/0012217 | A1* | 1/2013 | Suda | .................. H04W 72/0446 455/450 |

(Continued)

FOREIGN PATENT DOCUMENTS

WO    WO 2018/194218 A1    11/2017

OTHER PUBLICATIONS

3GPP TSG-RAN WG1 Meeting #85, Nanjing, P.R. China May 23-27, 2016, R1-165031, "On the wireless relay operation in NR", Nokia, Alcatel-Lucent Shanghai Bell, 6 pgs.

(Continued)

*Primary Examiner* — Clemence S Han
(74) *Attorney, Agent, or Firm* — Harrington & Smith

(57) ABSTRACT

An apparatus including at least one processor and at least one memory including computer code for one or more programs, the at least one memory and the computer code configured, with the at least one processor, to cause the apparatus at least to: generate information for controlling dynamic allocation between backhaul and access links within time division duplex time slots; and convey the information to a relay node within an indicator in a downlink fixed time slot.

24 Claims, 11 Drawing Sheets

(56) References Cited

U.S. PATENT DOCUMENTS

| | | | | |
|---|---|---|---|---|
| 2013/0034043 | A1* | 2/2013 | Yu | H04W 72/085 |
| | | | | 370/315 |
| 2013/0315109 | A1* | 11/2013 | Raaf | H04B 7/15528 |
| | | | | 370/277 |
| 2014/0307586 | A1* | 10/2014 | Zhang | H04L 5/0085 |
| | | | | 370/254 |
| 2016/0255613 | A1* | 9/2016 | Faerber | H04W 72/1215 |
| | | | | 370/330 |
| 2016/0338087 | A1* | 11/2016 | Ratasuk | H04W 72/0413 |
| 2017/0078077 | A1* | 3/2017 | Hessler | H04W 72/0446 |
| 2017/0196015 | A1* | 7/2017 | Lu | H04W 72/12 |
| 2017/0208574 | A1* | 7/2017 | Ramakrishna | H04B 7/155 |
| 2017/0289976 | A1* | 10/2017 | Lai | H04W 28/02 |
| 2017/0346525 | A1* | 11/2017 | Stirling-Gallacher | |
| | | | | H04B 7/0695 |
| 2019/0089502 | A1* | 3/2019 | Yi | H04L 5/0041 |
| 2019/0165851 | A1* | 5/2019 | Tiirola | H04B 7/155 |
| 2019/0335495 | A1* | 10/2019 | Yi | H04L 5/0007 |
| 2020/0196341 | A1* | 6/2020 | Mishra | H04J 11/0056 |

OTHER PUBLICATIONS

3GPP TSG-RAN WG1 #86, Gothenburg, Sweden, Aug. 22-26, 2016, R1-167267, "On the wireless relay/self-backhauling operation in NR", Nokia, Alcatel-Lucent Shanghai Bell, 6 pgs.

3GPP TSG RAN WG1 #90, Prague, Czech Republic, Aug. 21-25, 2017, "R1-1714497, Dynamic resource allocation for Integrated Access and Backhaul", Samsung, 3 pgs.

8881123GPP TSG RAN Meeting #75, Dubrovnik, Croatia, Mar. 6-9, 2017, RP-170821, "New SID Proposal: Study on Integrated Access and Backhaul for NR", AT&T, Qualcomm, Samsung, 5 pgs.

3GPP TSG RAN Meeting #75, Dubrovnik, Croatia, Mar. 6-9, 2017, RP-170847, "New WID on New Radio Access Technology", NTT Docomo, Inc., 8 pgs.

* cited by examiner

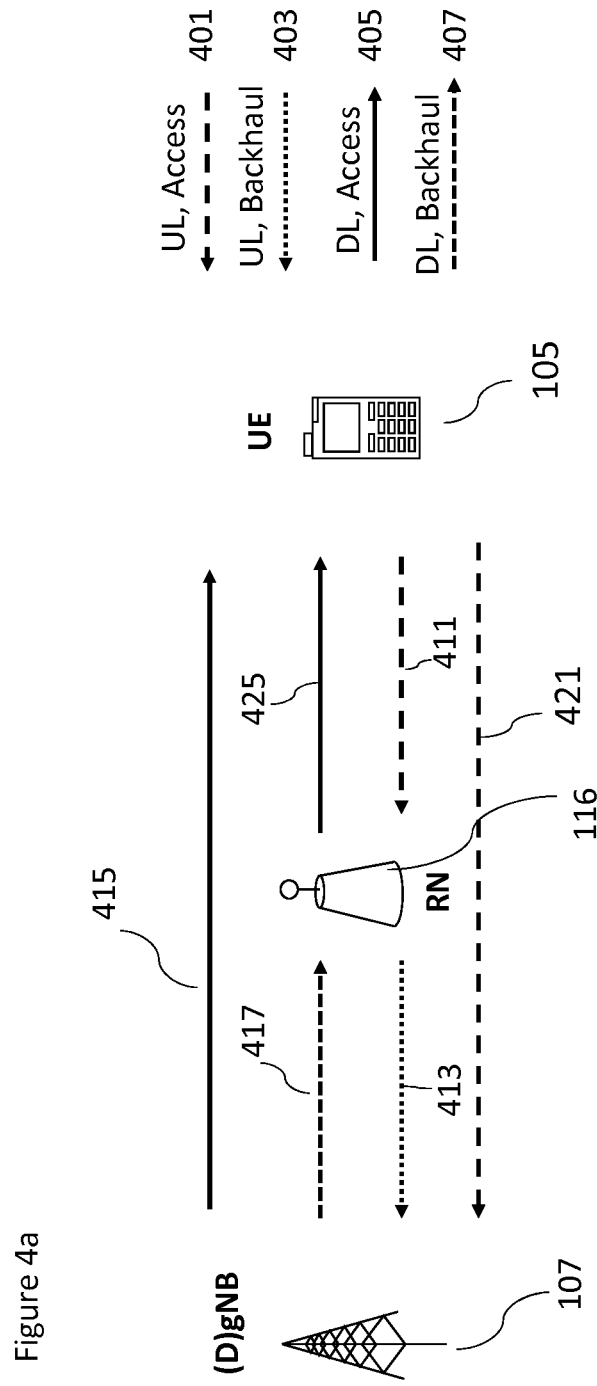

METHOD AND APPARATUS FOR BACKHAUL IN 5G NETWORKS

CROSS REFERENCE TO RELATED APPLICATION

This patent application is a U.S. National Stage application of International Patent Application Number PCT/EP2017/081073 filed Nov. 30, 2017, which is hereby incorporated by reference in its entirety.

FIELD

The present application relates to a method, apparatus, system and computer program and in particular but not exclusively to a method and apparatus for backhaul in a 5G New Radio communications network.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station or access point, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio), long-term evolution (LTE) of the Universal Mobile Telecommunications System (UMTS), and now 5G New Radio (NR) radio-access technology. 5G NR is being standardized by the 3rd Generation Partnership Project (3GPP).

One of the aspects of 5G New Radio (NR) is the physical layer design and related 3 NR functionalities for enhanced mobile broadband (eMBB) and ultra-reliable low-latency-communication (URLLC). The NR under this work item (NR Phase I) should consider frequency ranges up to 52.6 GHz. It is expected that NR work continues after Phase I with various enhancements, including also frequency ranges larger than 52.6 GHz. The 5G NR should be able to allow network deployment with minimized manual efforts and as automated self-configuration as possible. Especially on higher frequency bands the coverage can be an issue and specific capabilities are needed for NR to enable easy coverage extension with minimized/none requirements for network (re-)planning in a fast and cost-effective manner.

NR thus (and mainly for these reasons) has the requirement to support self-backhauling where the same carrier is used for the backhaul connection and the access links. In other words enabling in-band backhaul operation. A specific relaying node can be used to provide wireless backhaul connection (instead of having a wired connection) to a base station with fixed connection to the network backhaul. The serving base station(s) then may have the overall control of the usage of the radio resources considering both access and backhaul links.

The considered self-backhauling scenarios include both frequency division duplex (FDD) and time division duplex (TDD). However, is expected that TDD scenarios are more important in the commercial deployments. Another common assumption for relay nodes in TDD scenario is that a RN cannot transmit and receive at the same time at least towards the same direction. This is called as half-duplex constraint and it causes additional restrictions to the radio resource allocation and scheduling.

SUMMARY

According to an aspect, there is provided an apparatus comprising at least one processor and at least one memory including computer code for one or more programs, the at least one memory and the computer code configured, with the at least one processor, to cause the apparatus at least to: generate information for controlling dynamic allocation between backhaul and access links within time division duplex time slots; and convey the information to a relay node within an indicator in a downlink fixed time slot.

The apparatus caused to convey the information to a relay node within an indicator in a downlink fixed time slot may be caused to convey the information as one of: a part of a downlink grant, wherein the dynamic allocation may be for an additional backhaul downlink; a part of an uplink grant, wherein the dynamic allocation is for an additional backhaul uplink; and a media access control common element.

The apparatus caused to convey the information to a relay node within an indicator in a downlink fixed time slot may be caused to convey the information as part of a group-common physical downlink control channel.

The information may comprise information to control dynamic allocation between backhaul and access links within time division multiplex time slots based on a backhaul hop value or separately for each hop.

The information may comprise information to control dynamic allocation between backhaul and access links within time division duplex time slots for one of: one or more time division time slots; and one or more portions of a time slot.

The apparatus caused to convey the information to a relay node within an indicator in a downlink fixed time slot is caused to convey the information as part of a group-common physical downlink control channel may be further caused to indicate a link direction to be used in the backhaul and access link.

The apparatus may be further caused to: generate further information for controlling allocation between backhaul and access links within time division duplex time slots on a fixed basis; and convey the further information to the relay node, such that the relay node may be configured to control backhaul and access links within the time division duplex time slots on the fixed basis unless otherwise indicated by the information within the indicator in the downlink fixed time slot.

The apparatus may be further caused to: generate information for controlling PDCCH monitoring within the relay node; and convey the information for controlling PDCCH monitoring within the relay node to the relay node within the indicator.

The apparatus may be further caused to: generate information for uplink control signalling; and convey the information for uplink control signalling to the relay node within the indicator.

The information may comprise information on at least one of: downlink control channel allocation in the backhaul; downlink data channel allocation in the backhaul; uplink control channel allocation in the backhaul; uplink data channel allocation in the backhaul; channel state information—reference signal allocation in the backhaul downlink; and sounding reference signal allocation in the backhaul uplink.

According to a second aspect there is provided an apparatus comprising at least one processor and at least one memory including computer code for one or more programs, the at least one memory and the computer code configured, with the at least one processor, to cause the apparatus at least to: receive information for controlling dynamic allocation between backhaul and access links within time division duplex time slots within an indicator in a downlink fixed time slot; and control a dynamic allocation between backhaul and access links within time division duplex time slots based on the received information within the indicator in the downlink fixed time slot.

The downlink fixed time slot may be one of: a part of a downlink grant, wherein the dynamic allocation is for an additional backhaul downlink; a part of an uplink grant, wherein the dynamic allocation is for an additional backhaul uplink; and a media access control common element.

The downlink fixed time slot may be part of a group-common physical downlink control channel.

The information may comprise information identifying a backhaul hop value and the apparatus may be associated with a backhaul hop value within a multi-hop backhaul arrangement, and wherein the apparatus caused to control a dynamic allocation between backhaul and access links within time division duplex time slots based on the received information within the indicator in the downlink fixed time slot may be caused to control dynamic allocation between backhaul and access links within time division multiplex time slots based on the backhaul hop value matching the apparatus backhaul hop value within the multi-hop backhaul arrangement.

The apparatus caused to control a dynamic allocation between backhaul and access links within time division duplex time slots based on the received information within the indicator in the downlink fixed time slot may be caused to control dynamic allocation between backhaul and access links within time division multiplex time slots separately for each hop.

The information may comprise information to control dynamic allocation between backhaul and access links within time division duplex time slots for one of: one or more time division time slots; and one or more portions of a time slot.

The group-common physical downlink control channel may be further caused to indicate a link direction to be used in the backhaul and access link, and wherein the apparatus caused to control a dynamic allocation between backhaul and access links within time division duplex time slots based on the received information within the indicator in the downlink fixed time slot may be caused to control link direction in the dynamic allocation between backhaul and access links within time division multiplex time slots based on the link direction to be used in the backhaul and access link.

The apparatus may be further caused to: receive further information for controlling allocation between backhaul and access links within time division duplex time slots on a fixed basis; and control backhaul and access links within the time division duplex time slots on the fixed basis unless otherwise indicated by the information within the indicator in the downlink fixed time slot.

The apparatus may be further caused to receive within the indicator information for controlling PDCCH monitoring within the apparatus.

The apparatus may be further caused to: receive, within the indicator, information for uplink control signalling; and configure uplink control signalling based on the information for uplink control signalling.

The information may comprise information on at least one of: downlink control channel allocation in the backhaul; downlink data channel allocation in the backhaul; uplink control channel allocation in the backhaul; uplink data channel allocation in the backhaul; channel state information—reference signal allocation in the backhaul downlink; and sounding reference signal allocation in the backhaul uplink.

The apparatus may be further caused to determine at least one of: a buffer status, a scheduling request; a physical random access channel request and wherein the apparatus caused to control a dynamic allocation between backhaul and access links within time division duplex time slots based on the received information within the indicator in the downlink fixed time slot may be caused to control the dynamic allocation further based on the determined at least one of: buffer status, scheduling request; physical random access.

According to a third aspect there is provided a method comprising: generating information for controlling dynamic allocation between backhaul and access links within time division duplex time slots; and conveying the information to a relay node within an indicator in a downlink fixed time slot.

Conveying the information to a relay node within an indicator in a downlink fixed time slot may comprise conveying the information as one of: a part of a downlink grant, wherein the dynamic allocation is for an additional backhaul downlink; a part of an uplink grant, wherein the dynamic allocation is for an additional backhaul uplink; and a media access control common element.

Conveying the information to a relay node within an indicator in a downlink fixed time slot may comprise conveying the information as part of a group-common physical downlink control channel.

The information may comprise information to control dynamic allocation between backhaul and access links within time division multiplex time slots based on a backhaul hop value or separately for each hop.

The information may comprise information to control dynamic allocation between backhaul and access links within time division duplex time slots for one of: one or more time division time slots; and one or more portions of a time slot.

Conveying the information to a relay node within an indicator in a downlink fixed time slot may comprise conveying the information as part of a group-common physical downlink control channel, the information may be further caused to indicate a link direction to be used in the backhaul and access link.

The method may further comprise: generating further information for controlling allocation between backhaul and access links within time division duplex time slots on a fixed basis; conveying the further information to the relay node, such that the relay node is configured to control backhaul and access links within the time division duplex time slots on the fixed basis unless otherwise indicated by the information within the indicator in the downlink fixed time slot.

The method may further comprise: generating information for controlling PDCCH monitoring within the relay node; and conveying the information for controlling PDCCH monitoring within the relay node to the relay node within the indicator.

The method may further comprise: generating information for uplink control signalling; and conveying the information for uplink control signalling to the relay node within the indicator.

The information may comprise information on at least one of: downlink control channel allocation in the backhaul; downlink data channel allocation in the backhaul; uplink control channel allocation in the backhaul; uplink data channel allocation in the backhaul; channel state information—reference signal allocation in the backhaul downlink; and sounding reference signal allocation in the backhaul uplink.

According to a fourth aspect there is provided a method comprising: receiving information for controlling dynamic allocation between backhaul and access links within time division duplex time slots within an indicator in a downlink fixed time slot; and controlling a dynamic allocation between backhaul and access links within time division duplex time slots based on the received information within the indicator in the downlink fixed time slot.

The downlink fixed time slot may be one of: a part of a downlink grant, wherein the dynamic allocation is for an additional backhaul downlink; a part of an uplink grant, wherein the dynamic allocation is for an additional backhaul uplink; and a media access control common element.

The downlink fixed time slot may be as part of a group-common physical downlink control channel.

The information may comprise information identifying a backhaul hop value and the method is associated with an apparatus with a backhaul hop value within a multi-hop backhaul arrangement, and wherein controlling a dynamic allocation between backhaul and access links within time division duplex time slots based on the received information within the indicator in the downlink fixed time slot may comprise controlling dynamic allocation between backhaul and access links within time division multiplex time slots based on the backhaul hop value matching the apparatus backhaul hop value within the multi-hop backhaul arrangement.

Controlling a dynamic allocation between backhaul and access links within time division duplex time slots based on the received information within the indicator in the downlink fixed time slot may comprise controlling dynamic allocation between backhaul and access links within time division multiplex time slots separately for each hop.

The information may comprise information to control dynamic allocation between backhaul and access links within time division duplex time slots for one of: one or more time division time slots; and one or more portions of a time slot.

The group-common physical downlink control channel may be further caused to indicate a link direction to be used in the backhaul and access link, and wherein controlling a dynamic allocation between backhaul and access links within time division duplex time slots based on the received information within the indicator in the downlink fixed time slot may comprise controlling link direction in the dynamic allocation between backhaul and access links within time division multiplex time slots based on the link direction to be used in the backhaul and access link.

The method may further comprise: receiving further information for controlling allocation between backhaul and access links within time division duplex time slots on a fixed basis; and controlling backhaul and access links within the time division duplex time slots on the fixed basis unless otherwise indicated by the information within the indicator in the downlink fixed time slot.

The method may further comprise receiving within the indicator information for controlling PDCCH monitoring within the apparatus.

The method may further comprise: receiving, within the indicator, information for uplink control signalling; and configuring uplink control signalling based on the information for uplink control signalling.

The information may comprise information on at least one of: downlink control channel allocation in the backhaul; downlink data channel allocation in the backhaul; uplink control channel allocation in the backhaul; uplink data channel allocation in the backhaul; channel state information—reference signal allocation in the backhaul downlink; and sounding reference signal allocation in the backhaul uplink.

The method may further comprise determining at least one of: a buffer status, a scheduling request; a physical random access channel request and wherein controlling a dynamic allocation between backhaul and access links within time division duplex time slots based on the received information within the indicator in the downlink fixed time slot may comprise controlling the dynamic allocation further based on the determined at least one of: buffer status, scheduling request; physical random access.

According to a fifth aspect there is provided an apparatus comprising: means for generating information for controlling dynamic allocation between backhaul and access links within time division duplex time slots; and means for conveying the information to a relay node within an indicator in a downlink fixed time slot.

The means for conveying the information to a relay node within an indicator in a downlink fixed time slot may comprise means for conveying the information as one of: a part of a downlink grant, wherein the dynamic allocation is for an additional backhaul downlink; a part of an uplink grant, wherein the dynamic allocation is for an additional backhaul uplink; and a media access control common element.

The means for conveying the information to a relay node within an indicator in a downlink fixed time slot may comprise means for conveying the information as part of a group-common physical downlink control channel.

The information may comprise information to control dynamic allocation between backhaul and access links within time division multiplex time slots based on a backhaul hop value or separately for each hop.

The information may comprise information to control dynamic allocation between backhaul and access links within time division duplex time slots for one of: one or more time division time slots; and one or more portions of a time slot.

The means for conveying the information to a relay node within an indicator in a downlink fixed time slot may comprise means for conveying the information as part of a group-common physical downlink control channel, the information may be further caused to indicate a link direction to be used in the backhaul and access link.

The apparatus may further comprise: means for generating further information for controlling allocation between backhaul and access links within time division duplex time slots on a fixed basis; and means for conveying the further information to the relay node, such that the relay node is configured to control backhaul and access links within the time division duplex time slots on the fixed basis unless otherwise indicated by the information within the indicator in the downlink fixed time slot.

The apparatus may further comprise: means for generating information for controlling PDCCH monitoring within the relay node; and means for conveying the information for controlling PDCCH monitoring within the relay node to the relay node within the indicator.

The apparatus may further comprise: means for generating information for uplink control signalling; and means for conveying the information for uplink control signalling to the relay node within the indicator.

The information may comprise information on at least one of: downlink control channel allocation in the backhaul; downlink data channel allocation in the backhaul; uplink control channel allocation in the backhaul; uplink data channel allocation in the backhaul; channel state information—reference signal allocation in the backhaul downlink; and sounding reference signal allocation in the backhaul uplink.

According to a sixth aspect there is provided an apparatus comprising: means for receiving information for controlling dynamic allocation between backhaul and access links within time division duplex time slots within an indicator in a downlink fixed time slot; and means for controlling a dynamic allocation between backhaul and access links within time division duplex time slots based on the received information within the indicator in the downlink fixed time slot.

The downlink fixed time slot may be one of: a part of a downlink grant, wherein the dynamic allocation is for an additional backhaul downlink; a part of an uplink grant, wherein the dynamic allocation is for an additional backhaul uplink; and a media access control common element.

The downlink fixed time slot may be as part of a group-common physical downlink control channel.

The information may comprise information identifying a backhaul hop value and the apparatus is associated with a backhaul hop value within a multi-hop backhaul arrangement, and wherein the means for controlling a dynamic allocation between backhaul and access links within time division duplex time slots based on the received information within the indicator in the downlink fixed time slot may comprise means for controlling dynamic allocation between backhaul and access links within time division multiplex time slots based on the backhaul hop value matching the apparatus backhaul hop value within the multi-hop backhaul arrangement.

The means for controlling a dynamic allocation between backhaul and access links within time division duplex time slots based on the received information within the indicator in the downlink fixed time slot may comprise means for controlling dynamic allocation between backhaul and access links within time division multiplex time slots separately for each hop.

The information may comprise information to control dynamic allocation between backhaul and access links within time division duplex time slots for one of: one or more time division time slots; and one or more portions of a time slot.

The group-common physical downlink control channel may be further caused to indicate a link direction to be used in the backhaul and access link, and wherein the means for controlling a dynamic allocation between backhaul and access links within time division duplex time slots based on the received information within the indicator in the downlink fixed time slot may comprise means for controlling link direction in the dynamic allocation between backhaul and access links within time division multiplex time slots based on the link direction to be used in the backhaul and access link.

The apparatus may further comprise: means for receiving further information for controlling allocation between backhaul and access links within time division duplex time slots on a fixed basis; and means for controlling backhaul and access links within the time division duplex time slots on the fixed basis unless otherwise indicated by the information within the indicator in the downlink fixed time slot.

The apparatus may further comprise means for receiving within the indicator information for controlling PDCCH monitoring within the apparatus.

The apparatus may further comprise: means for receiving, within the indicator, information for uplink control signalling; and means for configuring uplink control signalling based on the information for uplink control signalling.

The information may comprise information on at least one of: downlink control channel allocation in the backhaul; downlink data channel allocation in the backhaul; uplink control channel allocation in the backhaul; uplink data channel allocation in the backhaul; channel state information—reference signal allocation in the backhaul downlink; and sounding reference signal allocation in the backhaul uplink.

The apparatus may further comprise means for determining at least one of: a buffer status, a scheduling request; a physical random access channel request and wherein the means for controlling a dynamic allocation between backhaul and access links within time division duplex time slots based on the received information within the indicator in the downlink fixed time slot may comprise means for controlling the dynamic allocation further based on the determined at least one of: buffer status, scheduling request; physical random access.

In another aspect there is provided a computer program embodied on a non-transitory computer-readable storage medium, the computer program comprising program code for providing any of the above methods.

In another aspect there is provided a computer program product for a computer, comprising software code portions for performing the steps of any of the previous methods, when said product is run.

A computer program comprising program code means adapted to perform the method(s) may be provided. The computer program may be stored and/or otherwise embodied by means of a carrier medium.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which:

FIG. 4a shows example backhaul link configurations;

DETAILED DESCRIPTION

The concept as discussed in further detail hereafter focuses on wireless relay operation (self-backhauling a.k.a. integrated access and backhaul, IAB) on top of a NR frame structure. Furthermore, these embodiments as discussed hereafter focus on a time division duplex (TDD) relay scenario, where the relay is configured with support for wireless relay operation. In other embodiments scenarios where radio resources can be allocated between backhaul and access links, as well as between uplink (UL) and downlink (DL) in a flexible manner are discussed while minimizing both access and backhaul link latencies.

Before explaining in detail the examples, certain general principles of a wireless communication system and mobile communication devices are briefly explained with reference to FIGS. 1 to 2 to assist in understanding the technology underlying the described examples.

Figure 1:
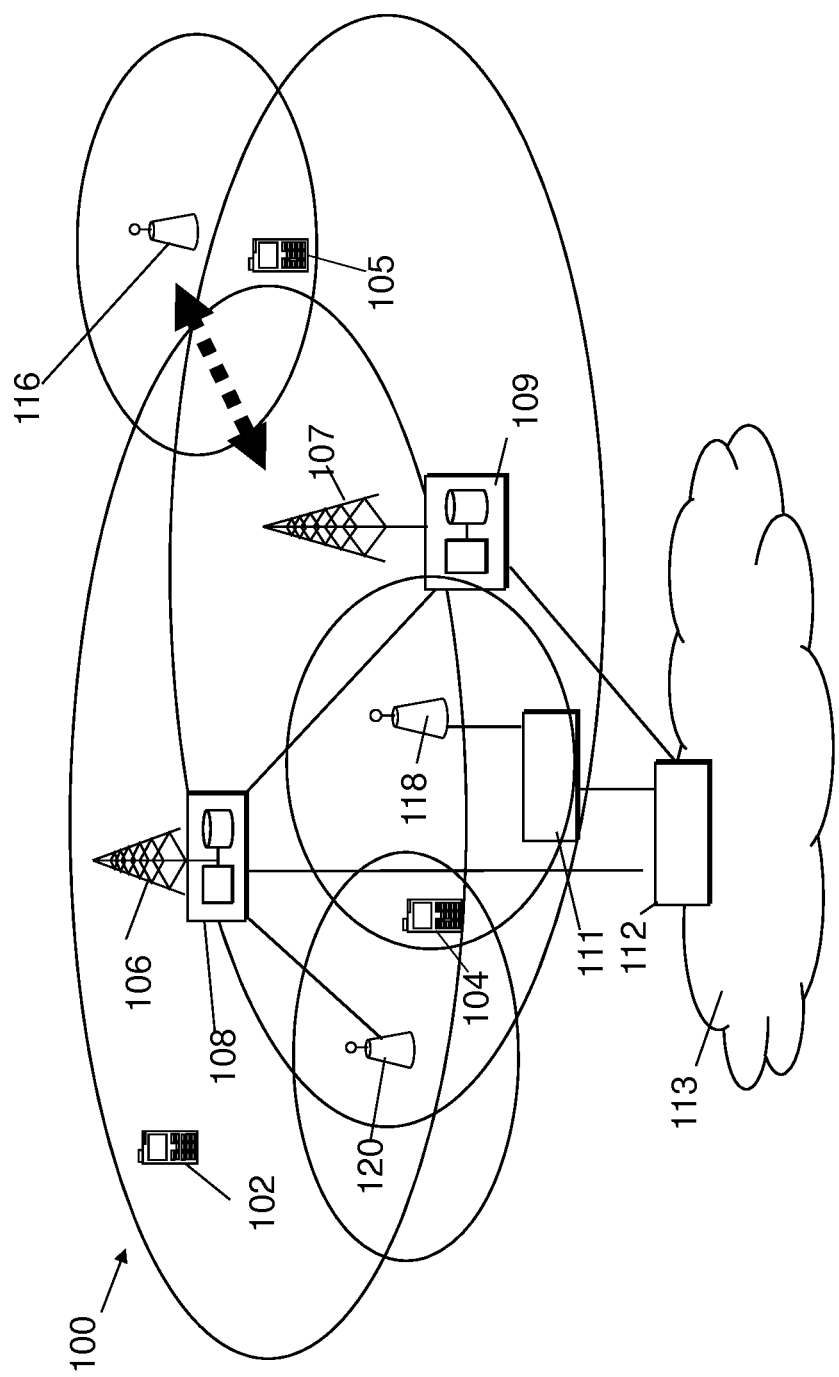
FIG. 1 shows a schematic diagram of an example communication system comprising a plurality of base stations and a plurality of communication devices.

In a wireless communication system 100, such as that shown in FIG. 1, mobile communication devices or user equipment (UE) 102, 104, 105 are provided wireless access via at least one access point or similar wireless transmitting and/or receiving node or point. An access point or base station is referred to as a Node B or generally NB (for example an eNB in LTE and gNB in 5G NR). Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control apparatus 108 and 109 are shown to control the respective macro level base stations 106 and 107. In some systems, the control apparatus may additionally or alternatively be provided in a radio network controller.

LTE (and 5G) systems may however be considered to have a so-called "flat" architecture, without the provision of RNCs; rather the NB is in communication with a system architecture evolution gateway (SAE-GW) and a mobility management entity (MME), which entities may also be pooled meaning that a plurality of these nodes may serve a plurality (set) of NBs. Each UE is served by only one MME and/or S-GW at a time and the NB keeps track of current association. SAE-GW is a "high-level" user plane core network element in LTE, which may consist of the S-GW and the P-GW (serving gateway and packet data network gateway, respectively). The functionalities of the S-GW and P-GW are separated and they are not required to be co-located.

In FIG. 1 base stations 106 and 107 are shown as connected to a wider communications network 113 via gateway 112. A further gateway function may be provided to connect to another network.

The smaller base stations (or relay nodes or RN) 116, 118 and 120 may also be connected to the network 113, for example by a separate gateway function and/or via the controllers of the macro level stations. The base stations 116, 118 and 120 may be pico or femto level base stations or the like. In the example, station 118 is connected via a gateway 111 whilst station 120 connects via the controller apparatus 108. The station 116 may be connected via station 107 as will be explained in further detail hereafter. In some embodiments, the smaller stations may not be provided.

Figure 2:
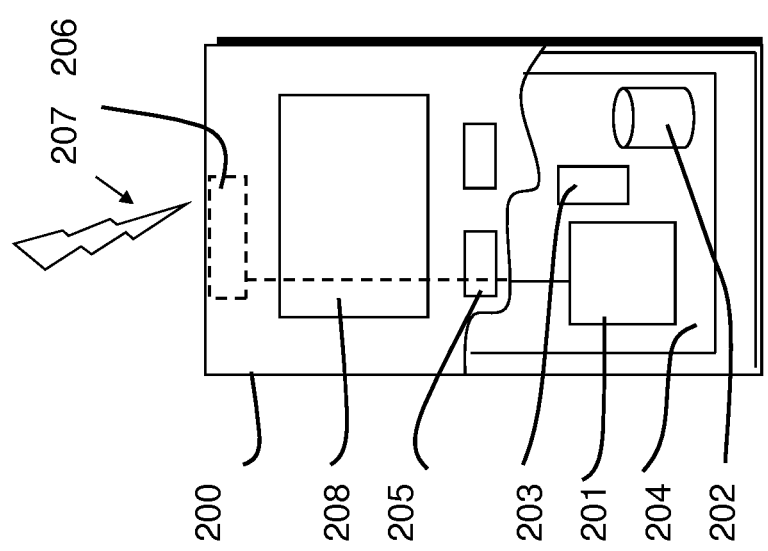
FIG. 2 shows a schematic diagram of an example mobile communication device.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto. The communication devices 102, 104, 105 may access the communication system based on various access techniques.

Figure 3:
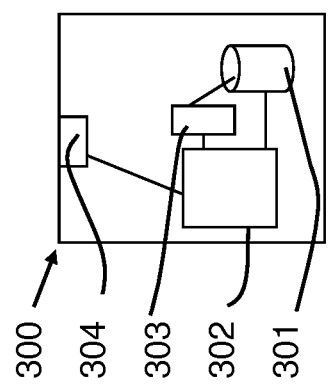
FIG. 3 shows a schematic diagram of an example control apparatus.

An example control apparatus (and/or base station) is shown in FIG. 3. FIG. 3 shows an example of a control apparatus provided in a base station or access point. The control apparatus 300 comprises at least one memory 301, at least one data processing unit 302, 303 and an input/output interface 304. Via the interface the control apparatus can be coupled to a receiver and a transmitter of the base station. The receiver and/or the transmitter may be implemented as a radio front end or a remote radio head. For example the control apparatus 300 or processor 302/303 can be configured to execute an appropriate software code to provide the control functions.

An example of wireless communication systems are architectures standardized by the 3rd Generation Partnership Project (3GPP). The currently being developed 3GPP based development, release 15, is often referred to as the 5G NR standards part of long term evolution (LTE) or LTE Advanced Pro of the Universal Mobile Telecommunications System (UMTS) radio-access technology. Other examples of radio access system comprise those provided by base stations of systems that are based on technologies such as Multefire (or other unlicensed access such as LTE-U), wireless local area network (WLAN) and/or WiMax (Worldwide Interoperability for Microwave Access).

As discussed earlier one of the aspects of these wireless communications systems is wireless relay operation (self-backhauling) on top of the NR frame structure. In particular a TDD relay scenario which has an inbuilt support for wireless relay operation.

With respect to FIG. 4, an example of separate links existing in the scenario having a gNB (or donor gNB—DgNB) 107, a relay node (RN) 116 and a UE 105. In this scenario there are Access links between a node and UE, which may for example be an uplink access link 401 (such as the link 421 between the gNB and UE and the link 411 between the RN and UE) or a downlink access link 405 (the link 415 between the gNB and UE and link 425 between the RN and UE). Furthermore in FIG. 4 is shown the backhaul links or links between access points such as the RN and gNB, which may be an uplink backhaul link 403 (link 413 between the gNB and RN) or downlink backhaul link 407 (link 417 between the gNB and RN). In the following disclosure the donor gNB is referred to as gNB for simplicity.

Generally speaking, there are four different duplexing combinations for relay operation:

1. Frequency division duplex (FDD), Outband relay: using separate carriers for UL/DL and Access/BH (Backhaul)

2. FDD, Inband relay: using separate carriers for UL/DL but the same carrier handles Access/BH.

3. Time division duplex (TDD), Outband relay: using separate carriers for Access/BH but the same carrier handles UL/DL.

4. TDD, Inband relay: one carrier handles both UL/DL & Access/BH.

Figure 4B:
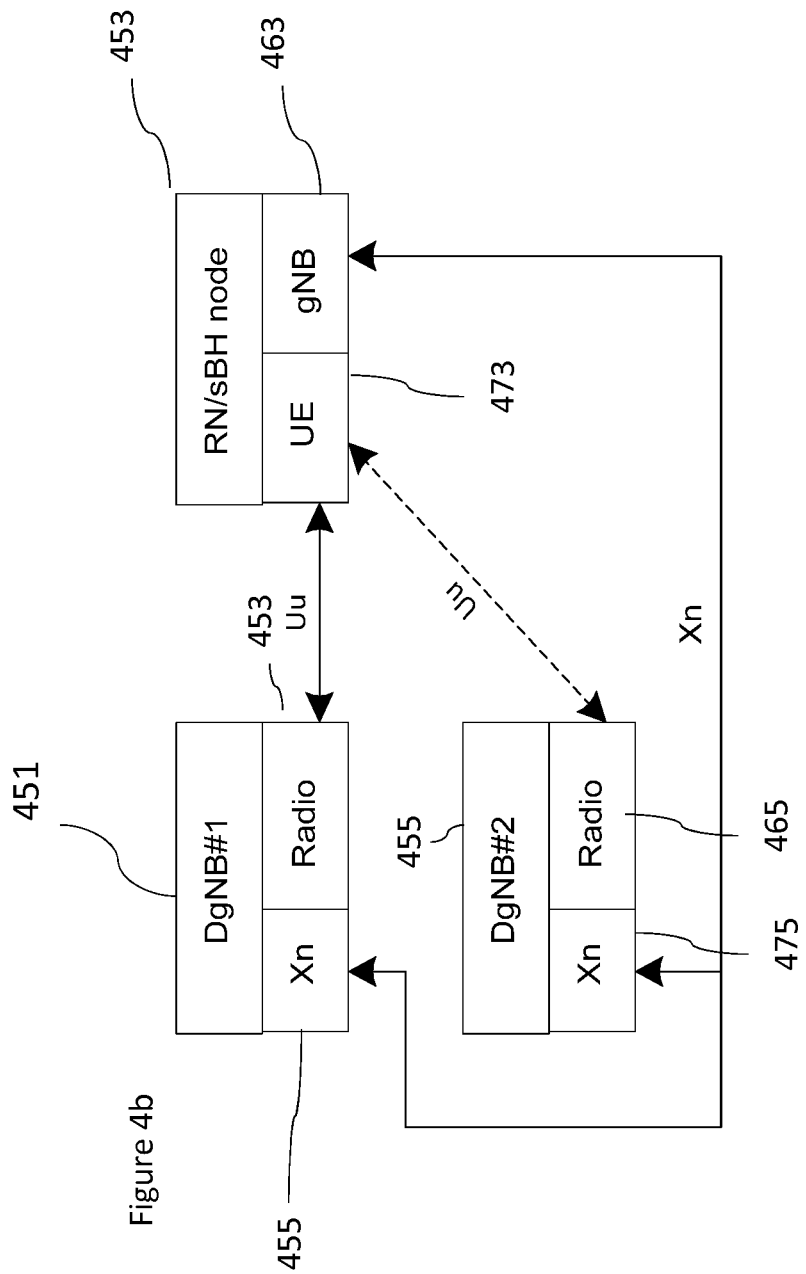
FIG. 4b shows an example of the logical functions and interfaces in the scenario where RN (self-backhaul node, sBH) is connected to a Donor cell (DgNB #1) and has a candidate cell to connect to in case the radio connection to DgNB #1 is lost.

The following embodiments and examples focus is on the fourth category, TDD in-band relay, which is also called self-backhaul. However, at least certain embodiments of the invention are covered also by categories 1-3 of these four different duplexing combination. FIG. 4b shows an example of the logical functions and interfaces in the scenario where RN 453 (self-backhaul node, sBH) is connected to a Donor cell 453 (DgNB #1) and has a candidate cell DgNB #2 455 to connect to in case the radio connection to DgNB #1 451 is lost. A connection may be lost for example due to radio blocking (e.g. obstacles moving between the nodes, excessive interference, etc) and the changes may be quite fast requiring fast reaction to find an alternative path and resuming the connection to the network.

The RN 453 node can be configured with two logical functionalities:

A UE part 473 configured to control the communication with the Donor cell 451 over the radio interface (Uu) which may be configured to:

At the power-up, select and access the best cell and establishing the BH connection; Cell/beam monitor and re-select in case of changing radio connections: Beam measurements/ selection, cell evaluation and triggering handover.

A base station part (gNB) 463 having all the gNB functions to serve the UEs in the RN cell including RN cell broadcasting: Synchronization signals (SSB), system information (SI), paging, etc.

Connection control of the UEs in the RN cell

Acting as a Donor node to the following RN node in case of multi-hop relaying

Communication with the other gNBs over the Xn interface

Connecting to the core network (CN), not shown in the figure.

The Xn interface between the RN 453 and DgNBs 451 455 or other RNs may in some embodiments be physically implemented over the Uu interface among other data or signalling but otherwise the same Xn signalling and procedures between the RNs/gNBs can be supported.

Figure 5:
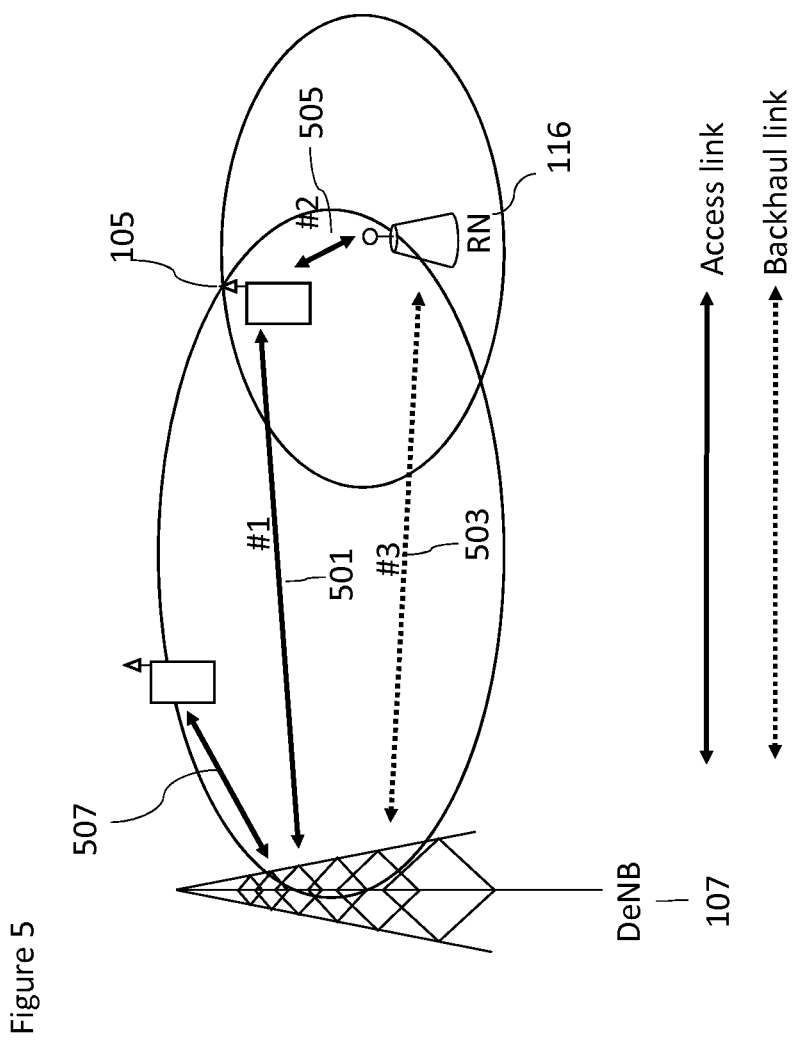
FIG. 5 shows an example self-backhaul situation.

With respect to FIG. 5, an example scenario is shown where TDD, Inband relay duplexing is shown. In the following examples there is implemented a synchronized network and half-duplex technology (in other words a node cannot transmit and receive simultaneously on the same band). Furthermore in the following examples the UE connected to RN should be able to connect also to the gNB as it enables favourable interference conditions for the access link, as well as providing improved opportunities for mobility optimization and coordinated radio resource usage between different cells.

In the example shown in FIG. 5 the gNB 107, UE 105 and RN 116 are shown with a first (uplink and downlink) access link 501 between the gNB and UE, a second (UL/DL) access link 505 between the UE and RN and a backhaul link (UL/DL) 503 between the gNB and RN. Also is shown in FIG. 5 a further access link 507 between the gNB and a further UE.

If the RN creates a cell with wireless backhaul transparent to the UE, UEs in the RN cell do not distinguish the cells of gNBs and RNs. In such case a normal radio resource management (RRM) operation (e.g. mobility with handovers) is assumed with or without RN deployment. Transparent operation may also be achieved so that the relay node operates as a transmitter/receiver point (Tx/Rx point, TRP) within a cell of an access node (or within a cell of another RN).

There is currently discussion on how to implement Self-backhauling in these situations as the access links (501 and 505) and Backhaul link 503 cannot be run simultaneously since in this case both UE and RN are either transmitting or receiving.

Figure 6:
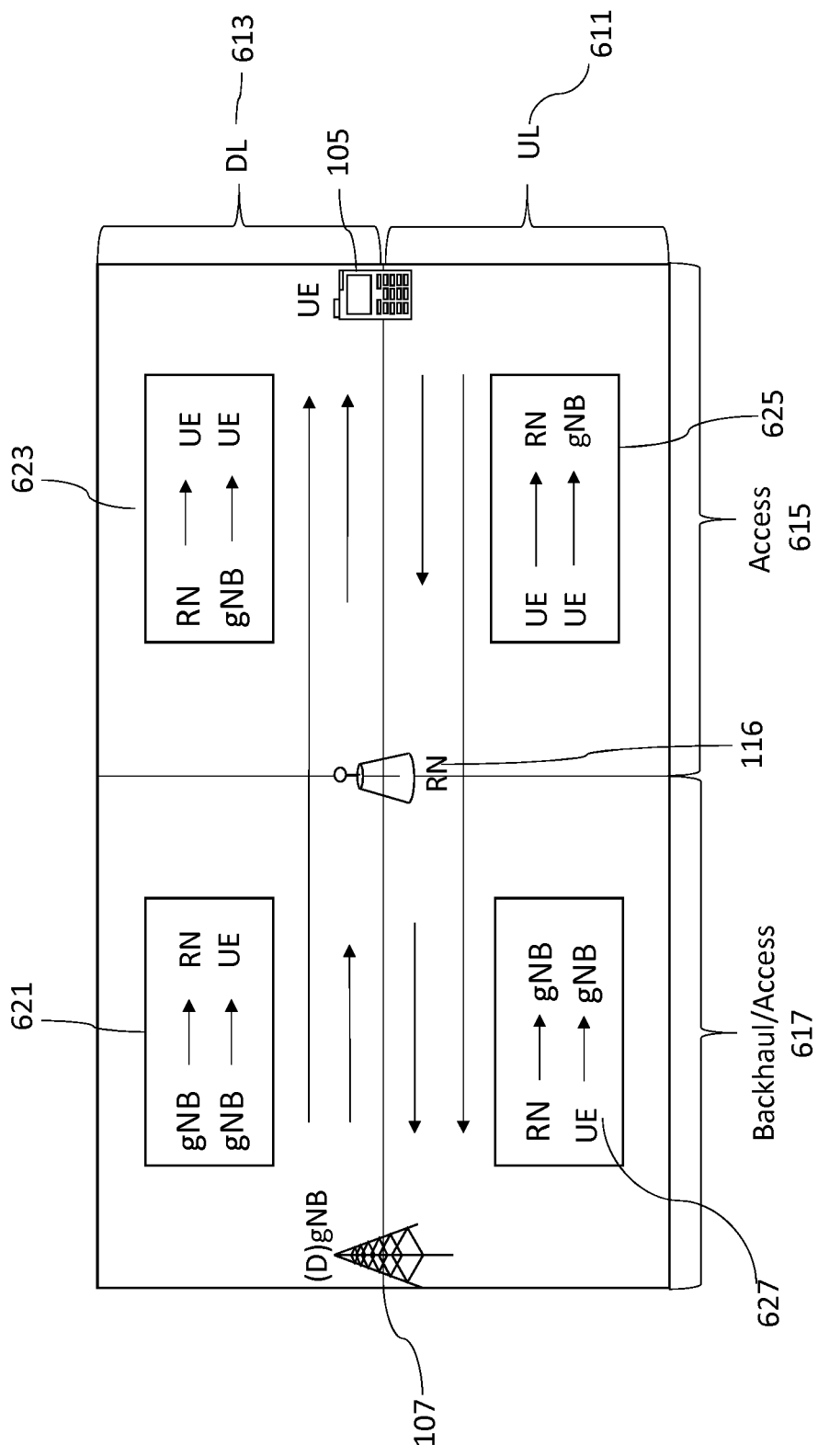
FIG. 6 shows an example multiplexing solution between Access and Backhaul links.

An implementation of four separate links to support this scenario is shown in FIG. 6. FIG. 6 shows the known multiplexing implementation wherein the uplink UL 611 and DL 613 divisions and the backhaul/access 617 and access (only) 615 link divisions are shown. The links can thus be divided into a first group 621 comprising the link from gNB to RN (backhaul downlink) and gNB to UE (access downlink), a second group 623 comprising the link from RN to UE (access downlink) and gNB to UE (access downlink), a third group 625 comprising the link from UE to RN (access uplink) and UE to gNB (access uplink) and a fourth group 627 comprising the link from RN to gNB (backhaul uplink) and UE to gNB (access uplink). The BH DL, BH UL, Access DL, Access UL operate in time division multiplexing with respect to each other. The time resolution for changing the link from one group to another may be one or more OFDM symbol(s), one or more mini-slot(s), or one or more slot(s) depending on the scenario. It may be also different for control channels (such as PDCCH, PUCCH) and data channels (such as PDSCH, PUSCH).

In the NR frame structure design, both slot and mini-slots have been agreed to be supported. The duration of a slot is 14 symbols.

Figure 7:
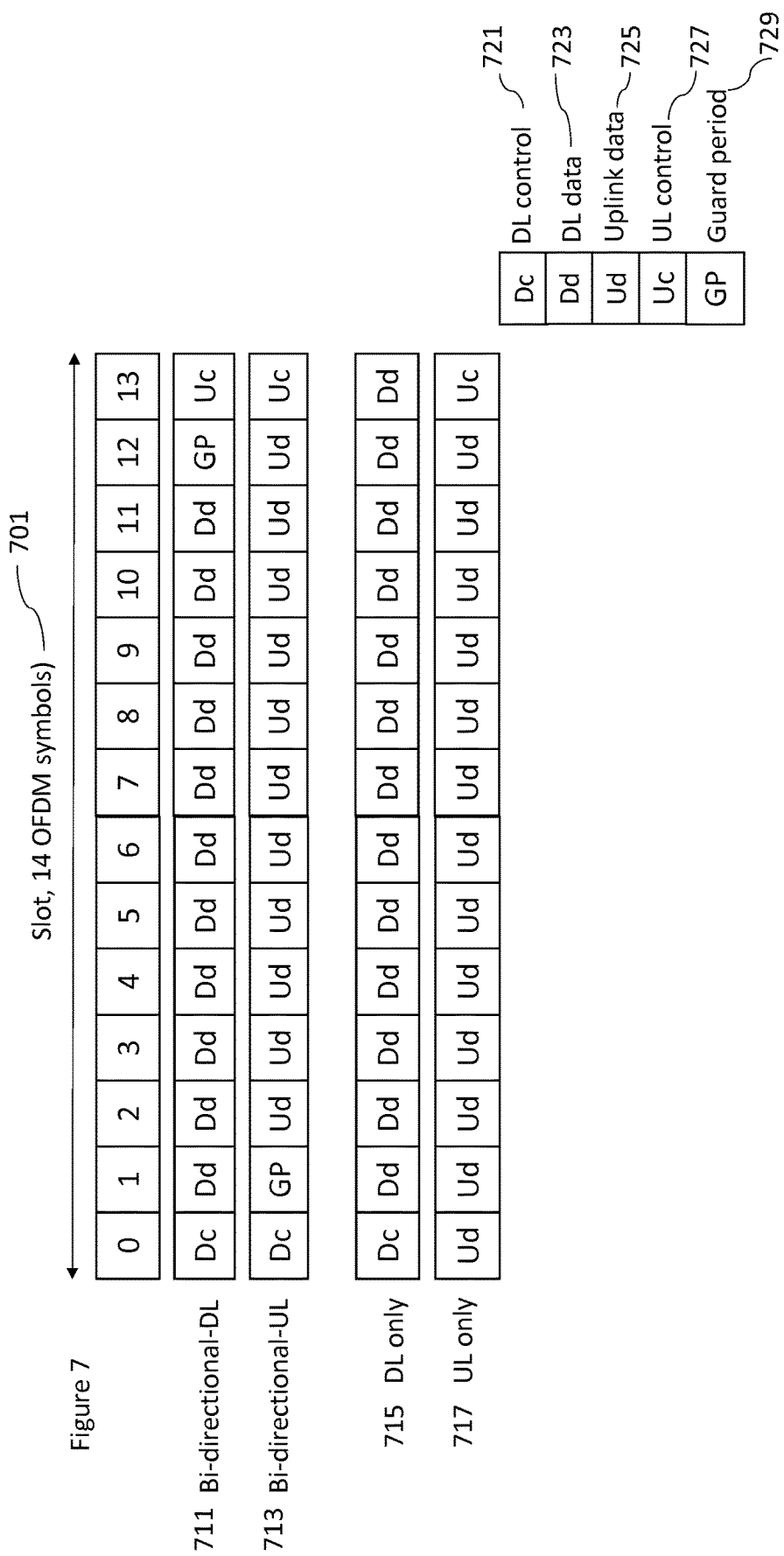
FIG. 7 shows example slot types in a TDD 5G NR configuration.

There can be four slot types, as shown in FIG. 7, which provide support for both TDD and FDD. A slot 701 of 14 OFDM symbols is shown in FIG. 7.

A first slot type 711 (Bi-directional-DL) is shown wherein the first symbol is a downlink control symbol 721, there are then a number of downlink data symbols 723 (in this example 11 symbols) followed by a guard period 729 and then an uplink control symbol 727. It should be noted that various configuration options for the slots formats are available, e.g., based on the usage scenario. For example, the number of DL control symbols per slot may vary, the number of symbols reserved for guard period may vary, and the number of uplink control symbols (short PUCCH) may vary as well.

A second slot type 713 (Bi-directional-UL) is shown wherein the first symbol is a downlink control symbol 721, there is then a guard period 729 followed by a number of uplink data symbols 725 (in this example 11 symbols) and then an uplink control symbol 727.

A third slot type 715 (DL only) is shown wherein the first symbol is a downlink control symbol 721, there are then a number of downlink data symbols 723 (in this example 13 symbols). A fourth slot type 717 (UL only) is shown wherein the first symbols are a number of uplink data symbols 725 (in this example 13 symbols) and then an uplink control symbol 727.

In other words for the bi-directional slots, there is either downlink data or uplink data transmission in each slot, as well as the corresponding downlink and uplink control. The Bi-directional slot facilitates many crucial TDD functionalities in the NR frame structure, such as
  Link direction switching between DL and UL
  Fully flexible traffic adaptation between DL and UL
  Opportunity for low latency, provided that the slot length is selected to be short enough.

In all slots, multiplexing between DL control (Dc) 721, DL/UL data (Dd/Ud) 723 725, GP 729 and UL control (Uc) 727 is based primarily on time division multiplexing allowing fast energy efficient pipeline processing of control and data in the receiver. A Physical Downlink Control Channel (PDCCH) is conveyed in the DL control symbol(s) located at the beginning of the slot (or the mini-slot). However, the option of PDCCH and PDSCH multiplexing in frequency domain is not excluded.

Also in addition to bi-directional slots, there are also the DL-only slot and UL-only slot types. These are implemented in FDD modes, but may also be implemented in certain TDD scenarios to allow longer transmission periods in single UL or DL direction.

Figure 8:
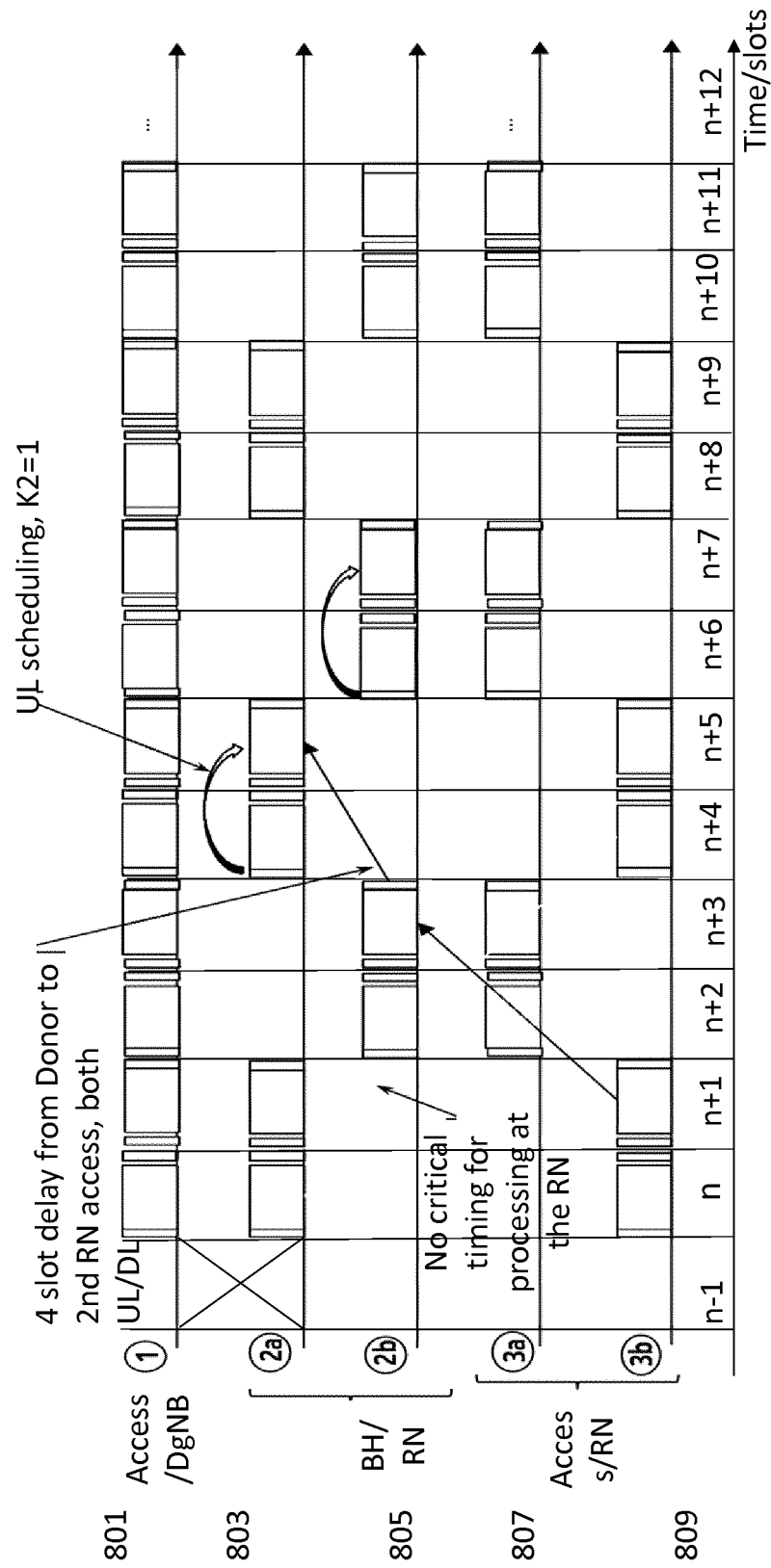
FIG. 8 shows a known example slot allocation to access/backhaul and access link(s)

One suggested implementation for enabling TDD slot based self-backhaul implementation is a fixed slot allocation for access and backhaul in a multi-hop scenario such as shown in FIG. 8. In the example shown in FIG. 8 the communication between the UE and the gNB may have a number of RN between them. This number of RNs may be defined as k=0, 1, 2, 3, . . . (where k=0 corresponds to a gNB to UE communication) and furthermore slots can be numbered as n=0, 1, 2, . . . . Furthermore, K0 illustrates the DL scheduling delay (in slots) and K2 UL scheduling delay (in slots), respectively.

The first row 801 shows a k=0 example where the UE communicates via an access link to the gNB. In this example there are alternating slots of Bi-directional-DL types as shown for slots n, n+2, n+4, and so on and Bi-directional-UL types as shown for slots n+1, n+3, n+5 and so on.

The second row 803 shows a k is an odd integer value (e.g. k=1, 3, 5 . . . ) example (such as where a master or donor gNB communicates with a first RN). In this example there are pairs of active slots which are then separated by two non-active (receiving only) slots. Thus for example FIG. 8 shows Bi-directional-DL slots n, n+4, n+8, and so on and Bi-directional-UL slots n+1, n+5, n+9 and so on.

The third row 805 shows a k>=2 is an even integer value (e.g. k=2, 4, 6, 8 . . . ) example (such as where the first RN communicates with a second RN). In this example there are pairs of active slots which are then separated by two non-active (receiving) slots and arranged such that the active slots occur when the first RN is non-active (as shown in row 803) and the non-active slots when the first RN is active. Thus for example FIG. 8 shows a Bi-directional-DL slot for slots n+2, n+6, n+10, and so on and Bi-directional-UL types as shown for slots n+3, n+7, n+11 and so on.

The fourth row 807 shows a k=1 example where the first RN communicates with a UE. In this example there are pairs of active slots which are then separated by two non-active (receiving) slots and arranged such that the active slots occur when the first RN is non-active and the non-active slots when the first RN is active. Thus for example FIG. 8 shows a Bi-directional-DL slot for slots n+2, n+6, n+10, and so on and Bi-directional-UL types as shown for slots n+3, n+7, n+11 and so on.

The fifth row 809 shows a k=2 example where the second RN communicates with a UE. In this example there are pairs of active slots which are then separated by two non-active (receiving) slots and arranged such that the active slots occur when the second RN is non-active and the non-active slots when the second RN is active. Thus for example FIG. 8 shows a Bi-directional-DL slot for slots n, n+4, n+8, and so on and Bi-directional-UL types as shown for slots n+1, n+5, n+9 and so on.

In other words the above may be summarised as a fixed slot allocation with the following rules:

For Slot 4n (i.e. slot 0, 4, 8, . . . ): this is a bi-directional DL slot (with symbols for DL control, DL data, UL control) for gNB access, backhaul link between RNs 2k and 2k+1, and access link for RN (2k+2).

For Slot 4n+1 (i.e. slot 1, 5, 9, . . . ): this is a bi-directional UL slot (with symbols for DL control, UL data, UL control) for gNB access, backhaul link between RNs 2k and 2k+1, and access link for RN (2k+2).

For Slot 4n+2 (i.e. slot 2, 6, 10, . . . ): this is a bi-directional DL slot (with symbols for DL control, DL data, UL control) for gNB access, access link for RN (2k+1), and backhaul link between RNs 2k+1 and 2k+2.

For Slot 4n+3 (i.e. slot 3, 7, 11, . . . ): this is a bi-directional UL slot (with symbols for DL control, UL data, UL control) for gNB access, access link for RN (2k+1), and backhaul link between RNs 2k+1 and 2k+2.

The concept as discussed hereafter is one in which a dynamic and fully flexible radio resource allocation between Backhaul and Access links is implemented, as well as between UL and DL. The example method shown in FIG. 8 which simply and straightforwardly divides radio resources (considering also the TDD constraints) produces fixed or (semi-)statically configured slot allocations to backhaul and access links. However the implemented dynamic and flexible implementation as described hereafter is able to adapt to traffic load variations and thus can fully utilize the capacity on the radio interface. Moreover, the implemented dynamic and flexible implementation as described hereafter results in decreased latencies as the resources are made available earlier when the data becomes ready for transmission. In total, the spectrum efficiency is increased (and which benefits the operator of the network) in the implemented dynamic and flexible implementation as described hereafter as well as improving the provided service quality (which benefits the end user).

The concept as discussed in further detail is for management of NR physical resource split between backhaul and access e.g. on slot level resolution and in particular on a dynamic allocation between the BH and access links. One aspect of the embodiments as described herein is to facilitate simultaneous traffic adaptation between UL and DL.

The embodiments as described herein feature a system configured to implement three slot types:
1. Fixed (default) slots configuration:
   a. Both link direction and slot type BH or access are predefined
   b. There can be four fixed slot types (such as shown in the example in FIG. 8 (Access DL/UL, Backhaul DL/UL). (From UE point of view, Backhaul DL/UL may be seen as Access DL/UL slot as shown in FIG. 6)
2. Flexible link direction but fixed access/backhaul slot configuration
   a. DL access & UL access
   b. DL BH & UL BH
3. Flexible access/backhaul and flexible link direction slot configuration In the embodiments described in further detail hereafter the fixed slots (type 1 slot) is configured to provide a basic or default level of functionality at the RN. The type 2 (flexible link direction but fixed access/backhaul) slots can be locally coordinated within the scheduling node.

The type 3 slots (Flexible access/backhaul and flexible link direction) may be implemented and used as flexible access slots (and provide functionality similar to the type 2 slots). In other words, the scheduling node (RN) in some embodiments is configured to manage the link direction between UL and DL.

Furthermore with respect to the type 3 slots the NB, or serving relay node (multi-hop case) may be configured to convert (or use) one or more flexible access/backhaul and flexible link direction slot configuration slots into BH DL, or BH UL slots. This provides the main mechanism for dynamic capacity adaptation between access and BH.

In some embodiments when parts of the Flexible access/backhaul and flexible link direction slot is converted to BH usage, the scheduling node (RN) is configured to determine that the slot/portion is a reserved or blanked resource. In some embodiments, the RN is configured such that it cannot receive or transmit access link signals during those time periods (including possible switching gaps in at least one end of the reserved portion).

Figure 9:
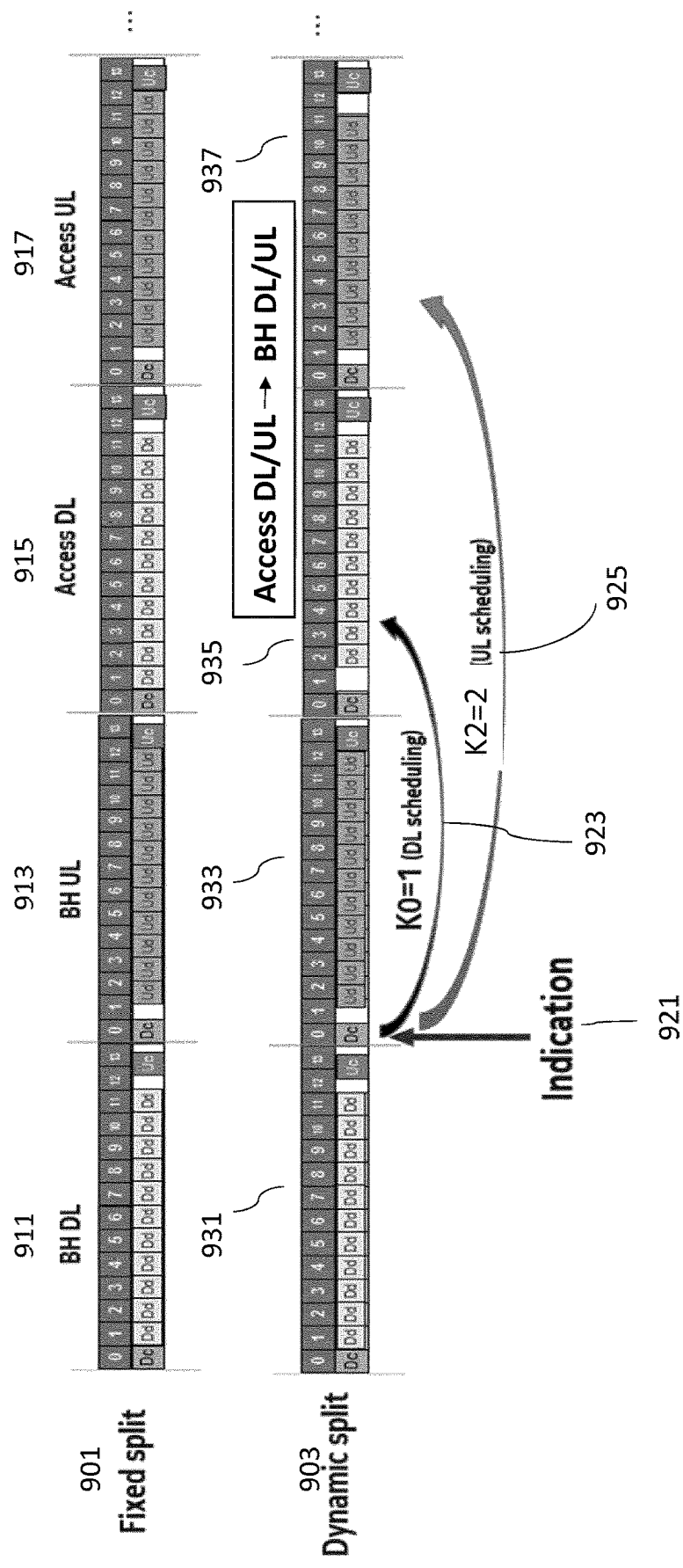
FIG. 9 shows example slot allocation to access/backhaul and access link(s) according to some embodiments.

With respect to FIG. 9 an example conversion of the flexible access/backhaul and flexible link direction slot (DL, UL) to BH DL, BH UL usage is shown. FIG. 9 shows a first row which is an example of a fixed slot configuration 901 where each slot has capacity for 14 symbols. The fixed slot configuration 901 furthermore shows the 4 slot cycle described above wherein the first slot of the 4 slot cycle is a backhaul downlink (BH DL) slot 911, the second slot is a backhaul uplink (BH UL) slot 913, the third slot is a access downlink (Access DL) slot 915 and the fourth slot is an access uplink (Access UL) slot 917.

FIG. 9 further shows in the second row an example of the slot configuration according to some embodiments. The slot configuration comprises a first two slots which are fixed slots, and thus shows a type 1 or fixed downlink slot 931, and a fixed uplink slots 933. The third 935 and the fourth 937 slots are type 3 slots which are configured to provide additional BH capacity on a need basis. As such an example of a flexible access/backhaul and flexible link direction slot wherein the RN is configured to receive an indication (indicator) 921 via a downlink control symbol (Dc) 921 in a fixed BH slot 923 and then configure the third slot 935 to provide a DL BH slot and configure the fourth slot 937 to provide a UL BH slot.

In some embodiments the indication can be conveyed as part of DL grant (an additional BH DL). In some other embodiments the indication can be conveyed as part of an UL grant (an additional BH UL). In some embodiments the indication can be conveyed as part of a media access control-common element (MAC-CE).

In some embodiments the indication may involve also group-common physical downlink control channel (PDCCH). This may be advantageous from an interference coordination point of view. It also provides a scalable solution to allocate multiple consecutive slots for additional BH usage.

In some embodiments the indication may cover one or multiple slots, or just one or multiple portions of the slot (such as control portion, or control+mini-slot). The BH slot conveying the indicator is configured to support at least PDCCH monitoring for the RN. In some embodiments the indicator may also support UL control signalling as well as UL/DL data transmission via the BH link. The scheduler in some embodiments is configured to consider the dynamic allocation providing sufficient guard periods for Rx/Tx changes.

In some embodiments the PDCCH DL allocation is determined for resources in the same slot (K0=0). The PDCCH of the backhaul slot, in addition (or instead of) DL allocation for the BH link in the same slot, is configure the following slot (or any of the following slots) to be used for BH instead of access link, this is shown in FIG. 9 by the arrows 923 and 925. This additional BH capacity may relate to at least one of: DL control channel in BH, DL data channel in BH, UL control channel in BH, UL data channel in BH, channel state information—reference signal (CSI-RS) in BH DL, sounding reference signal (SRS) in BH UL.

The indication related to additional BH capacity may be implemented based on dedicated downlink control information (DCI) sent to a RN or using a group common PDCCH sent to multiple RNs simultaneously. It may indicate the structure of the slot(s) with additional BH capacity, or alternatively the structure of relevant portion(s) of the slot (such as DL control/UL control portion). The RN may use the remaining part of the slot for NR access link (including also possible backhaul link for the next relay node in the multi-hop scenario) if only part of the slot is used for additional BH capacity. The PDCCH in the (re-)configured slot may in turn configure the subsequent slot(s) again for BH link if the BH traffic requires further capacity. Such procedure allows any type of resource allocation flexibly dividing the resources between access and BH based on the capacity and/or latency requirements.

As an example, DCI indicates that slot n+1 is a BH slot. This can be done using PDSCH/PUSCH/HARQ-ACK scheduling with K0, K1, K2>0 (slots). Another option is to make it using a group common PDCCH. The indication 921 may trigger also PDCCH monitoring for BH link at pre-defined symbol location(s). Those may be configured via higher layer signalling. The indication 921 may also trigger BH uplink control information (UCI) (such as SR, CSI, and HARQ-ACK) transmission via predefined BH control resources.

Thus in some embodiments the indicator is configured to include a hop value or information which when received by the relay node enables the relay node to determine whether to configure the flexible slot based on the hop value of the relay node (in other words the relay node k value).

In one embodiment, additional BH slots are allocated based on a buffer status report, scheduling request and/or PRACH request send via BH UL resources. This buffer status based allocation implementation may produce additional advantages for example when allocating additional BH slots for BH UL. In some embodiments the gNB may be configured to allocate additional BH slots for BH DL data based on the DL buffer status of the relay node(s).

The proposed solution provides opportunities for dynamically scalable split between BH/Access slots, as well as increased DL control (DL slot) or UL control (UL slot) opportunities for BH link.

In the following, we illustrate the role of using the group common PDCCH in more detail. In the following examples there is implemented interference coordination in the self-BH scenario supporting flexible traffic adaptation between UL and DL as well as between access and backhaul links.

In this example a predefined gNB is defined as being a master node which is responsible for interference coordination in a certain geographical area. The gNB is configured with a wired connection to the core network.

The master gNB forms a coordination area with one or more relay nodes. There can be also one or more (small cell) gNBs with wired connections as part of the coordination area.

The coordination area may be formed according to interference coupling between different network nodes (master gNB, gNB, UE, RN). The creation of a coordination area is implemented according to any known method and not described in any further detail.

In the Following Embodiments

The master gNB is configured to define the UL/DL split to be used in the coordination area. In some embodiments, all nodes (at least the master gNB, RNs and other gNBs within the coordination area) are configured to follow the defined UL/DL split.

The master gNB is further configured to define the BH/Access split to be used in the coordination area (in terms of slots). The split may be defined separately for each RN or group of RNs.

The master gNB furthermore is configured to indicate the defined UL/DL split to be used in the coordination area as well as the RN/RN group specific BH/Access split for relay nodes by means of SFI (slot format indication).

The master gNB in some embodiments is configured to create SFI for the [N] consecutive slots and conveys it to RNs.

In some embodiments the PDCCH is used for conveying SFI, and the RN is configured with specific group-common PDCCH containing such information.

The fixed BH DL control channel slots (/symbols) are used in some embodiments to convey this info and in some embodiments a default mode of configuration for each RN (and gNB) is the implementation of fixed BH slot allocation as described above.

In some embodiments the SFI information may be transferred also in those slots (among the [N] slots) that are configured for the BH link and where RN is configured to receive BH control data.

With respect to the RN implemented aspect of the system, the RN is configured to operate according to received slot format indicator:

The RN can therefore be configured to define a BH/Access split according to the information within the indicator.

Furthermore in some embodiments the RN is configured to define a UL/DL split for a RN Access link according to the information within the indicator.

The RN in some embodiments is configured to define BH L1 control channels according to this the information within the indicator including PDCCH monitoring in the BH links, and PUCCH in the BH links.

It is noted that there is a need for relatively high reliability for SFI indication, otherwise BH QoS may be reduced considerably. The control information transfer over PDCCH is un-acknowledged requiring robust MCS selection to guarantee minimized error probability. However this may be accepted as it is likely there is good link quality for the BH radio link because of a LOS (line of sight) connection and full/maximized antenna gains both in the master gNB and RN sites (RN can be a normal gNB, just without wired backhaul connection).

In some embodiments there can be implemented a fallback configuration or mode when the RN does not receive SFI (or otherwise, is not aware of the slot information e.g. due to absence of valid BH scheduling). In these cases:

The RN may be configured to listen for BH PDCCH from each slot (assuming that each slot is a potential BH DL slot). If PDCCH is found, the RN may operate accordingly. Also the RN may have to halt the access connection while regaining the synch with the master gNB or another RN.

The RN may also be configured to also listen for a group common PDCCH corresponding to the master gNB access link (if such signal has been configured). In such embodiments the DL slot without PDSCH may be scheduled for RN: the RN may be configured to use the remaining portion of the slot for the RN access link (by means of defining a mini-slot). Furthermore in such embodiments the UL slot without PUSCH may be scheduled for RN: the RN may be configured to use the remaining portion of the slot for RN access link (also by means of defining a mini-slot). Alternatively, if RN has a reason to send SR via a BH UL slot and the master gNB has provided opportunistic SR resource for RN, RN may be configured to transmit PUCCH via master gNB access link PUCCH resources.

Figure 10:
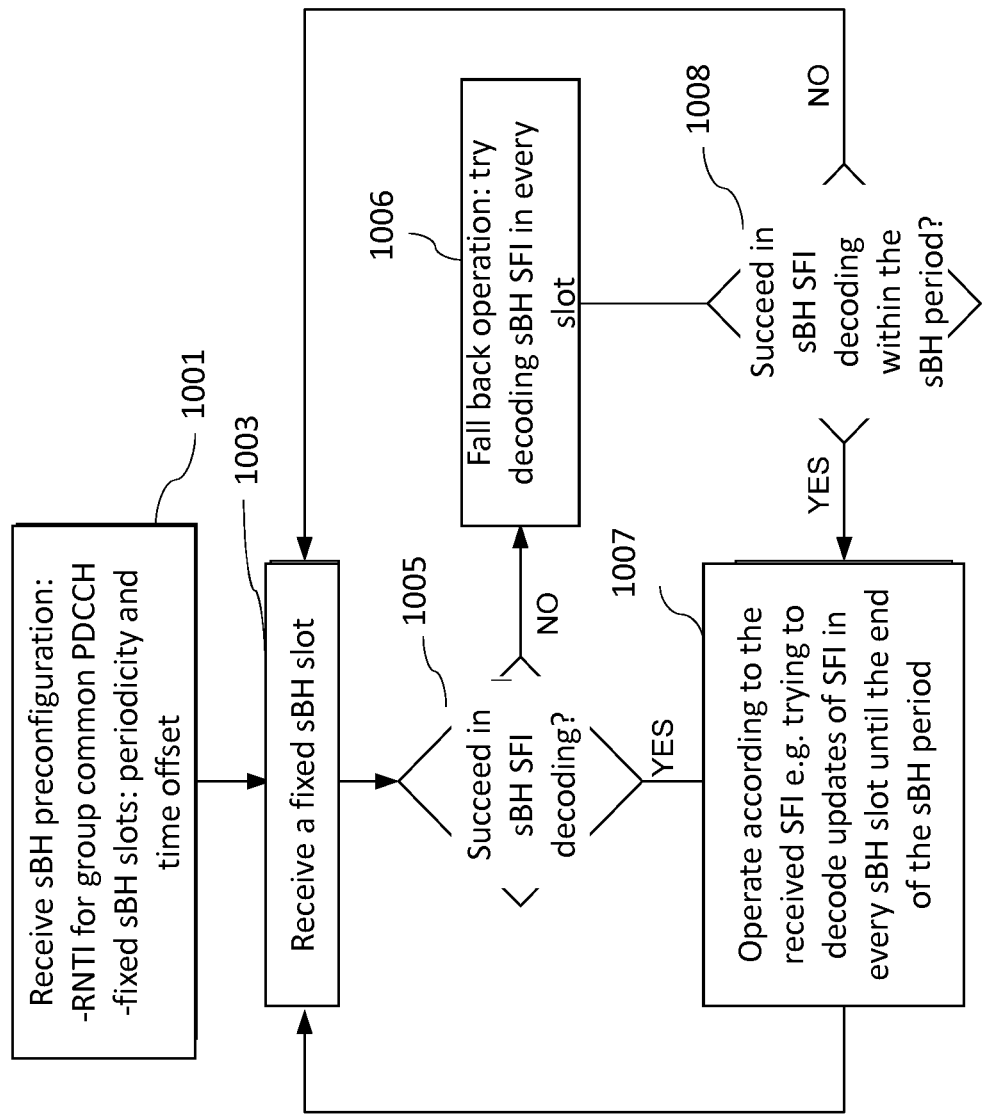
FIG. 10 shows a flowchart of an example method for flexible traffic adaptation within a relay node according to some embodiments.

With respect to FIG. 10 an example RN operation for the flexible traffic adaptation is shown.

Thus for example the RN is configured to receive self-BH pre-configuration information. For example by receiving Radio Network Temporary Identifier (RNTI) for the group common PDCCH and also the default (fixed) self-BH slots periodicity and time offset information.

The operation of receiving the self-BH pre-configuration information is shown in FIG. 10 by step 1001.

The next operation is receiving a default (fixed) self-BH slot as shown in FIG. 10 by step 1003.

The RN may then be configured to attempt to decode within the slot a self-BH slot format indicator (SFI). The RN is configured to check whether it succeeds in decoding the self-BH slot format indicator as shown in FIG. 10 by step 1005.

When the RN fails to decode the self-BH slot format indicator (SFI) then the RN is configured to use the fall-back configuration mode and attempt to decode a self-BH SFI in every slot as shown in FIG. 10 by step 1006.

The RN may then be configured to check whether it succeeds in decoding the self-BH slot format indicator within the self-BH period as shown in FIG. 10 by step 1008.

When the RN fails to decode the self-BH slot format indicator (SFI) within the self-BH period then the RN is configured to attempt to receive a further fixed self-BH slot as shown in FIG. 10 by the loop back to step 1003.

When the RN succeeds in decoding the self-BH slot format indicator (SFI) based on the check in step 1005 or succeeds in decoding the self-BH slot format indicator (SFI) within the self-BH period based on the check in step 1008 then the RN is configured to operate according to the received SFI. For example in some embodiments the RN is configured to try to decode updates of the SFI in every self-BH slot until the end of the self-BH period. The operating according to the received SFI is shown in FIG. 10 by step 1009.

The method may then attempt to receive a further fixed self-BH slot as shown in FIG. 10 by the loop back to step 1003.

In implementing such embodiments there are advantages such as minimization of latency for self-backhauling, the provision of dynamic and fully flexible radio resource allocation between Backhaul and Access link, as well as between UL and DL. Furthermore there may be no error cases due to different symbol timing & scalable control plane.

The embodiments as discussed herein supports self BH transparent to UE (due to the fact that symbol timing in access link does not depend on the BH link)

It should be understood that each block of the flowchart of the Figures and any combination thereof may be implemented by various means or their combinations, such as hardware, software, firmware, one or more processors and/or circuitry.

It is noted that whilst embodiments have been described in relation to one example of an unlicensed spectrum network, similar principles maybe applied in relation to other examples of networks. It should be noted that other embodiments may be based on other cellular technology other than LTE or on variants of LTE. For example, some embodiments may be used with so-called 5G New Radio or MulteFire. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. An apparatus comprising:
   at least one processor; and
   at least one non-transitory memory including computer code for one or more programs, the at least one memory and the computer code configured, with the at least one processor, to cause the apparatus at least to:
   generate information for controlling dynamic capacity allocation between backhaul links comprising at least one of an backhaul uplink or backhaul downlink and access links comprising at least one of an uplink access link or downlink access link within time division duplex time slots; and
   convey the information for controlling the dynamic capacity allocation to more than one relay node simultaneously within an indicator in a downlink fixed time slot using a group-common physical downlink.

2. The apparatus as claimed in claim 1, wherein the apparatus caused to convey the information to the more than one relay node within the indicator in the downlink fixed time slot is caused to convey the information as:
   a part of a downlink grant, wherein the dynamic capacity allocation is for an additional backhaul downlink;
   a part of an uplink grant, wherein the dynamic capacity allocation is for an additional backhaul uplink; or
   a media access control common element.

3. The apparatus as claimed in claim 1, wherein the apparatus caused to convey the information to the more than one relay node within the indicator in the downlink fixed time slot is caused to convey the information as part of the group-common physical downlink control channel.

4. The apparatus as claimed in claim 1, wherein the information comprises information to control dynamic capacity allocation between the backhaul links and the access links within time division multiplex time slots based on a backhaul hop value or separately for each hop.

5. The apparatus as claimed in claim 1, wherein the information comprises information to control dynamic capacity allocation between the backhaul links and the access links within time division duplex time slots for:
   one or more time division time slots; or
   one or more portions of a time slot.

6. The apparatus as claimed in claim 1, wherein the apparatus caused to convey the information to the more than one relay node within the indicator in the downlink fixed time slot is caused to convey the information as part of the group-common physical downlink control channel, wherein the group-common physical downlink control channel comprises a flexible link direction slot configured to indicate a link direction of the at least one backhaul uplink or backhaul downlink and the at least one of uplink access link or downlink access link to convey.

7. The apparatus as claimed in claim 1, wherein the apparatus is further configured to cause the apparatus to:
   generate further information for controlling allocation between the backhaul links and the access links within time division duplex time slots on a fixed basis;
   convey the further information to the more than one relay node, such that the more than one relay node is configured to control the backhaul links and the access links within the time division duplex time slots on the fixed basis unless otherwise indicated by the information within the indicator in the downlink fixed time slot.

8. The apparatus as claimed in claim 1, where the apparatus is further configured to cause the apparatus to:
   generate information for controlling physical downlink control channel monitoring within the more than one relay node; and
   convey the information for controlling physical downlink control channel monitoring within the more than one relay node to the more than one relay node within the indicator.

9. The apparatus as claimed in claim 1, where the apparatus is further configured to cause the apparatus to:
   generate information for uplink control signalling; and
   convey the information for uplink control signalling to the more than one relay node within the indicator.

10. The apparatus as claimed in claim 1, wherein the information comprises information on at least one of:
    downlink control channel allocation in the backhaul;
    downlink data channel allocation in the backhaul;
    uplink control channel allocation in the backhaul;
    uplink data channel allocation in the backhaul;
    channel state information—reference signal allocation in the backhaul downlink; or
    sounding reference signal allocation in the backhaul uplink.

11. An apparatus comprising at least one processor and at least one non-transitory memory including computer code for one or more programs, the at least one memory and the computer code configured, with the at least one processor, to cause the apparatus at least to:
    receive information for controlling dynamic capacity allocation between backhaul links comprising at least one of a backhaul uplink or backhaul downlink and access links comprising at least one of an uplink access link or a downlink within time division duplex time slots within an indicator in a downlink fixed time slot; and
    control a dynamic capacity allocation between the backhaul links and the access links to more than one relay node simultaneously within time division duplex time slots based on the received information within the indicator in the downlink fixed time slot using a group-common physical downlink.

12. The apparatus as claimed in claim 11, wherein the downlink fixed time slot is:
   a part of a downlink grant, wherein the dynamic capacity allocation is for an additional backhaul downlink;
   a part of an uplink grant, wherein the dynamic capacity allocation is for an additional backhaul uplink; or
   a media access control common element.

13. The apparatus as claimed in claim 11, wherein the downlink fixed time slot is as part of the group-common physical downlink control channel, wherein the group-common physical downlink control channel comprises a flexible link direction slot configured to indicate a link direction of the at least one backhaul uplink or backhaul downlink and the at least one of uplink access link or downlink access link to convey.

14. The apparatus as claimed in claim 11, wherein the information comprises information identifying a backhaul hop value and the apparatus is associated with a backhaul hop value within a multi-hop backhaul arrangement, and wherein the apparatus caused to control a dynamic capacity allocation between the backhaul links and the access links within time division duplex time slots based on the received information within the indicator in the downlink fixed time slot is caused to control dynamic capacity allocation between the backhaul links and the access links within time division multiplex time slots based on the backhaul hop value matching the apparatus backhaul hop value within the multi-hop backhaul arrangement.

15. The apparatus as claimed in claim 11, wherein the apparatus caused to control a dynamic capacity allocation between the backhaul links and the access links within time division duplex time slots based on the received information within the indicator in the downlink fixed time slot is caused to control dynamic capacity allocation between the backhaul links and the access links within time division multiplex time slots separately for each hop.

16. The apparatus as claimed in claim 11, wherein the information comprises information to control dynamic capacity allocation between the backhaul links and the access links within time division duplex time slots for:
   one or more time division time slots; or
   one or more portions of a time slot.

17. The apparatus as claimed in claim 11, wherein the apparatus caused to control a dynamic capacity allocation between the backhaul links and the access links within time division duplex time slots based on the received information within the indicator in the downlink fixed time slot is caused to control link direction in the dynamic capacity allocation between the backhaul links and the access links within time division multiplex time slots based on the link direction to be used in the backhaul and access link.

18. The apparatus as claimed in claim 11, wherein the apparatus is further configured to cause the apparatus to:
   receive further information for controlling allocation between the backhaul links and the access links within time division duplex time slots on a fixed basis; and
   control the backhaul links and the access links within the time division duplex time slots on the fixed basis unless otherwise indicated by the information within the indicator in the downlink fixed time slot.

19. The apparatus as claimed in claim 11, where the apparatus is further configured to cause the apparatus to receive, within the indicator, information for controlling physical downlink control channel monitoring within the apparatus.

20. The apparatus as claimed in claim 11, where the apparatus is further configured to cause the apparatus to:
   receive, within the indicator, information for uplink control signalling; and configure uplink control signalling based on the information for uplink control signalling.

21. The apparatus as claimed in claim 11, wherein the information comprises information on at least one of:
   downlink control channel allocation in the backhaul;
   downlink data channel allocation in the backhaul;
   uplink control channel allocation in the backhaul;
   uplink data channel allocation in the backhaul;
   channel state information—reference signal allocation in the backhaul downlink; or
   sounding reference signal allocation in the backhaul uplink.

22. The apparatus as claimed in claim 11, where the apparatus is further configured to cause the apparatus to determine at least one of: a buffer status, a scheduling request; a physical random access channel request and wherein the apparatus caused to control a dynamic capacity allocation between the backhaul links and the access links within time division duplex time slots based on the received information within the indicator in the downlink fixed time slot is caused to control the dynamic capacity allocation further based on the determined at least one of: buffer status, scheduling request; physical random access.

23. A method comprising:
   generating information for controlling dynamic capacity allocation between backhaul links comprising at least one of a backhaul uplink or backhaul downlink and access links comprising at least one of an uplink access link or a downlink within time division duplex time slots; and
   conveying the information for controlling the dynamic capacity allocation to more than one relay node simultaneously within an indicator in a downlink fixed time slot using a group-common physical downlink.

24. A method comprising:
   receiving information for controlling dynamic capacity allocation between backhaul links comprising at least one of a backhaul uplink or backhaul downlink and access links comprising at least one of an uplink access link or a downlink within time division duplex time slots within an indicator in a downlink fixed time slot; and
   controlling a dynamic capacity allocation between the backhaul links and the access links within time division duplex time slots based on the received information within the indicator in the downlink fixed time slot using a group-common physical downlink.

* * * * *